June 29, 1954 — O. LINDFORS — 2,682,631

SINGLE PHASE MOTOR CONTROL

Filed May 25, 1951

INVENTOR.
Onni Lindfors
BY
Paul L. Kircher
Atty.

Patented June 29, 1954

2,682,631

UNITED STATES PATENT OFFICE 2,682,631

SINGLE PHASE MOTOR CONTROL

Onni Lindfors, Freeport, Ill., assignor to Fairbanks, Morse & Co., Chicago, Ill., a corporation of Illinois Application May 25, 1951, Serial No. 228,224

1 Claim. (Cl. 318—221)

This invention relates to improvements in electric machines, and more particularly to a novel control provision for single phase motors of the capacity-start type.

The control provision of this invention is particularly suitable for application to a single phase motor having a starting circuit in shunt to the main field winding of the motor, wherein said starting circuit includes a starting field winding, a starting current phase shifting device such as a capacitance, and an electromagnetic switch for controlling the starting circuit. In practice, it is found that in the stopping of such a motor as by opening the power supply circuit, should the starting circuit control relay close the starting circuit during motor deceleration but while the motor speed is yet above a critical speed which in some cases may be as low as one-half normal motor operating speed, a so-called regenerative voltage is produced in the resulting closed circuit containing a capacitance as well as inductive components provided by the main and starting field windings of the motor. While such regenerative voltage tends to produce rapid deceleration of the motor, it has a deleterious effect upon the electromagnetic relay, in that it produces chattering of the relay with more or less severe arcing at the relay contacts. While a number of different control provisions are known and have been employed heretofore to prevent the build-up of a regenerative voltage in motor stopping, such provisions have been for the most part somewhat complicated and expensive, requiring in some instances additional or auxiliary relays and circuits of three or more wires between the motor and the line switch.

Accordingly, it is the principal purpose of the present invention to provide a relatively simple and effective control provision for preventing regenerative voltage build-up, which avoids the hereinabove mentioned disadvantages and others inherent in earlier provisions, and which requires no more than a two-wire connection between the motor and the line switch.

In carrying out the purpose or object as above stated, the present invention provides a single pole, double-throw line switch in circuit between the power supply source and the motor with but two-wires between the switch and motor, wherein the latter wires are connected together through the switch in one control position thereof, to form a short circuit about the motor field and starting circuit. In the other control position of the switch, such short circuit is broken and the power supply conductors connected for power supply to the motor over the aforementioned two conductors.

Other objects and advantages afforded by the present invention will appear from the following description of a presently preferred embodiment exemplified in the accompanying drawing wherein.

Figure 1:
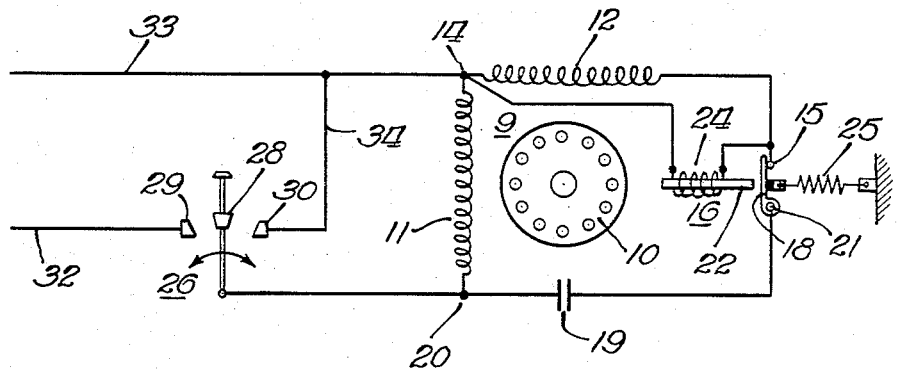
Fig. 1 is a circuit diagram of the motor and its switch-controlled power supply circuit.

Referring first to Fig. 1, the single phase, capacity start motor 9 there shown includes a rotor 10 and a main field winding 11. In shunt with the winding 11 is a motor starting circuit providing a starting field winding 12 connected to one terminal 14 of winding 11 and to a fixed contact 15 of an electromagnetic switch 16. The other or pivotally movable contact 18 of the electromagnetic switch is connected to one side of a capacitance 19, and the latter in turn is connected to the opposite terminal 20 of main field winding 11. Electromagnetic switch 16 further provides the movable contactor 18 pivotally supported at 21, and an armature 22 in fixed relation to contactor 18 and energized by the magnet winding 24 connected across motor starting winding 12 as shown. The movable contactor 18 normally is urged into engagement with the fixed contact 15 by a suitable tension spring 25, while opposite pivotal displacement of the contactor 18 as to open contact 15, is effected in response to energization of the coil 24 according to the potential of the motor starting winding 12. As is well known in this type of motor, when the motor is started, a starting current flows in the starting circuit because the relay is then closed at its contacts 15 and 18. As the motor accelerates toward normal or running speed, the voltage of the starting winding builds-up to a value sufficient to effect through the relay winding 24 and the core 22, opening displacement of the contactor 18, whereby to open the starting circuit. The relay 16 is calibrated through its winding 24 and the tension of spring 25, such as to condition circuit-opening response of the relay only to a predetermined voltage, as of a value attained in motor winding 12 as the motor speed approaches normal running speed. The relay further is of such character that once it is actuated to open the starting circuit, its response to the voltage induced in the starting winding 12 during motor operation, normally is sufficient to retain the contactor 18 displaced from contact with the contact 15.

Now when the motor is to be stopped, the supply circuit is opened and the motor begins to decelerate. If at such time the relay responds in an abnormal manner as to close the contacts 15 and 18 during the period of deceleration while the motor speed is yet above a certain critical speed which may be as low as 50% of normal motor speed, there results a closed circuit containing the capacitance 19 and inductance provided by the main field 11 and starting field 12. Such closed circuit tends to produce a regenerative voltage which causes a "braking" or rapid deceleration of the motor. More importantly however, the regenerative voltage produced in the closed circuit of the character indicated, tends to effect a more or less extensive chattering or rapid closing and opening of the relay 16, with consequent more or less severe arcing at the relay contacts. The present invention then, is directed to the elimination of the above described deleterious effects which tend to occur in the stopping of a single phase motor of the type mentioned.

To such end, the power supply circuit control or line switch 26 is provided as a single pole, double-throw switch having a single movable contactor 28 displaceable from one to the other of two contacts 29 and 30. The power supply circuit leading from a suitable source of single phase current (not shown), has one conductor 32 thereof connected to line switch contact 29, while the other power line conductor 33 is connected in circuit with the motor main field terminal 14. Further, the movable contactor 28 of the line switch is connected to the opposite motor terminal 20, while the remaining line switch contact 30 is connected by lead 34, to the power supply line 33. With the line switch and power supply circuit connected to the single phase motor as above described, it will appear that upon engagement of the contactor 28 with the fixed switch contact 29, power will be supplied to the motor for operation thereof. On the other hand, when it is desired to stop the motor, the line switch contactor 28 is moved away from the contact 29 and into contact with the fixed contact 30. This opens the power supply circuit to the motor and establishes through conductor 34 and the now closed contacts 28—30, a short circuit about the motor field 11 and the starting circuit in shunt therewith. This short circuit is entirely sufficient to prevent or preclude the occurrence of a regenerative voltage in the single phase motor circuit at any time during motor deceleration to a stopped condition.

Figure 2:
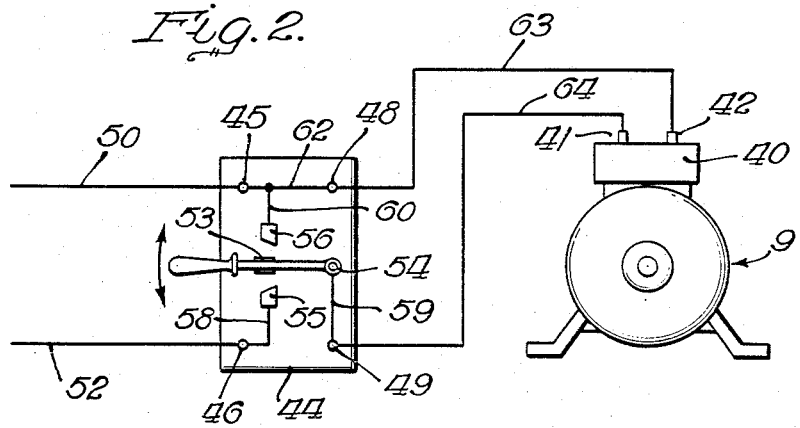
Fig. 2 illustrates the two-wire connection between the motor and a line switch provided in accordance with the invention.

Fig. 2 illustrates one important feature of the present invention, this respecting the two-wire connection between the motor and the power supply circuit or line switch. The motor 9 is here shown in end elevation and somewhat diagrammatically as including a box or auxiliary housing 40 carried thereby and in which may be arranged the capacitance or condenser 19 as shown in Fig. 1, and the electromagnetic relay 16 as illustrated in the first figure. Moreover, the two motor terminals 41 and 42 (corresponding respectively to the motor terminals 20 and 14 of Fig. 1) may be supported by the box 40. The line switch here shown, may comprise a base 44 supporting input terminals 45 and 46, and output terminals 48 and 49. One side 50 of a single phase power supply circuit is connected to the input terminal 45, while the other power supply conductor 52 is connected to input terminal 46. The switch further includes a movable contactor 53 pivoted to the base at 54, and opposite fixed contacts 55 and 56. Conductor 58 connects contact 55 to the input terminal 46, and conductor 59 connects the output terminal 49 to the movable contactor 53 through its pivot 54. The other fixed contact 56 is connected by a lead 60 to a conductor 62 which interconnects the input terminal 45 and output terminal 48. The supply and control circuit between the motor and line switch is comprised of the two conductors 63 and 64, the first extending between motor terminal 42 and line switch output terminal 48, while conductor 64 extends between motor terminal 41 and the line switch output terminal 49. Thus with this arrangement, only two wires as 63 and 64, are required between the motor and the line switch. The operation of the arrangement shown by Fig. 2 is exactly that described in connection with the circuit diagram of Fig. 1, it being noted that when contactor 53 is engaged with contact 55 the power supply circuit to the motor is completed, and that when contactor 53 is engaged with contact 56 the aforedescribed short circuit is completed in respect to the motor circuit, through conductors 64, 59, 60, 62 and 63.

Having now described a presently preferred embodiment of the invention, it is to be understood that certain modifications may be made thereto without departing from the intended scope of the invention.

I claim:

In combination with a single phase electric motor providing a main field winding having opposite end terminals and a starting circuit connected to said end terminals in shunt with the main field winding, wherein the starting circuit comprises in series-connection therein, a starting field winding, a capacitance and contacts of an electromagnetic switch having its magnet winding in shunt connection to the starting field winding, motor energization control and motor regenerative voltage preventing means for said single phase motor, comprising a two-position control switch providing first and second fixed contacts and a movable contact selectively engageable with said fixed contacts, a pair of power supply conductors, and a pair of motor lead conductors connected to the end terminals of the motor main field winding, one power supply conductor being connected to said first fixed contact of the control switch, one motor lead conductor being connected to said movable contact of the switch, and the remaining power supply conductor and motor lead conductor being connected to said second fixed contact of the control switch, whereby engagement of the movable contact with said first fixed contact determines motor energization from said power supply conductors through said pair of motor lead conductors, and engagement of the movable contact with said second fixed contact interconnects said pair of motor lead conductors to provide thereby, a short circuit between the end terminals of the motor main field winding.

References Cited in the file of this patent
UNITED STATES PATENTS

| Number | Name | Date |
|---|---|---|
| 522,851 | Pierce | July 10, 1894 |
| 755,772 | Hewlett | Mar. 29, 1904 |
| 1,828,724 | Yost | Oct. 20, 1931 |
| 1,944,090 | Lukens | Jan. 16, 1934 |
| 2,220,748 | Whiting | Nov. 29, 1940 |
| 2,296,123 | Stimson | Sept. 15, 1942 |